US008030592B2

(12) United States Patent
Weidman

(10) Patent No.: US 8,030,592 B2
(45) Date of Patent: Oct. 4, 2011

(54) APPARATUS AND METHOD FOR APPLYING ANTIFOULANTS TO MARINE VESSELS

(75) Inventor: Larry Weidman, Overland Park, KS (US)

(73) Assignee: Reintjes Marine Surface Technologies, LLC, Kansas City, MO (US)

( * ) Notice: Subject to any disclaimer, the term of this patent is extended or adjusted under 35 U.S.C. 154(b) by 1154 days.

(21) Appl. No.: 11/758,991

(22) Filed: Jun. 6, 2007

(65) Prior Publication Data

US 2008/0116178 A1 May 22, 2008

Related U.S. Application Data

(60) Provisional application No. 60/866,941, filed on Nov. 22, 2006.

(51) Int. Cl.
*B23K 10/00* (2006.01)

(52) U.S. Cl. ............. 219/121.47; 219/76.16; 219/121.5; 219/121.52; 427/488

(58) Field of Classification Search ............... 219/121.5, 219/121.51, 121.52, 75, 76.15, 76.16, 121.47, 219/121.48, 121.59; 427/488, 569; 239/81
See application file for complete search history.

(56) References Cited

U.S. PATENT DOCUMENTS

| | | | | |
|---|---|---|---|---|
| 3,010,009 | A * | 11/1961 | Ducati | 219/76.16 |
| 4,201,904 | A | 5/1980 | Weidman | |
| 4,370,538 | A * | 1/1983 | Browning | 219/121.59 |
| 5,041,713 | A | 8/1991 | Weidman | |
| 5,057,379 | A * | 10/1991 | Fayeulle et al. | 428/632 |
| 5,106,910 | A | 4/1992 | Weidman et al. | |
| 5,285,967 | A | 2/1994 | Weidman | |
| 5,357,075 | A * | 10/1994 | Muehlberger | 219/121.47 |
| 5,435,985 | A | 7/1995 | Pukkinen et al. | |
| 5,844,192 | A * | 12/1998 | Wright et al. | 219/76.16 |
| 5,992,798 | A | 11/1999 | Ferry | |
| 6,085,399 | A | 7/2000 | Fileccia | |
| 6,276,635 | B1 | 8/2001 | Ferry et al. | |
| 6,388,195 | B1 | 5/2002 | Studer et al. | |
| 6,488,773 | B1 | 12/2002 | Erhardt et al. | |
| 6,595,953 | B1 | 7/2003 | Coppi et al. | |
| 6,660,247 | B1 | 12/2003 | Gutowska et al. | |
| 7,074,919 | B2 | 7/2006 | Aubay et al. | |
| 7,216,814 | B2 | 5/2007 | Gardega | |
| 2005/0048218 | A1 | 3/2005 | Weidman | |
| 2005/0238952 | A1 | 10/2005 | Prengaman | |

* cited by examiner

*Primary Examiner* — Mark Paschall
(74) *Attorney, Agent, or Firm* — Hovey Williams LLP

(57) ABSTRACT

A plasma spray apparatus in the form of a gun is utilized to apply an antifoulant coating to marine vessels. The apparatus includes a plasma generator, an electrophoresis element, a heating element, a shield gas element, a liquid cooling system, a forced air system, and a vacuum system. The plasma generator ionizes gas to create a plasma stream, which is utilized in part to supply energy to the heating element that heats a powder material. The heated powder material is exposed to the electrophoresis element to create a covalently bonded coating material. The coating material is injected into the plasma stream and is applied to a target surface. The shield gas element injects a gas flow to surround and protect the plasma and coating material stream as the stream is in flight to the target surface. The liquid cooling system cools portions of the plasma generator and heating element. The forced air system cools a portion of the target surface as the coating material is being applied. The vacuum system removes fumes and stray particles during the application process.

19 Claims, 10 Drawing Sheets

APPARATUS AND METHOD FOR APPLYING ANTIFOULANTS TO MARINE VESSELS

RELATED APPLICATIONS

The present application claims priority benefit to U.S. provisional patent application entitled "APPARATUS AND METHOD FOR APPLYING ANTIFOULANTS TO MARINE VESSELS", Ser. No. 60/866,941, filed Nov. 22, 2006. This provisional application is incorporated into the present application by reference.

BACKGROUND OF THE INVENTION

1. Field of the Invention

Embodiments of the present invention relate to an apparatus and methods for applying coatings to a target surface. More particularly, embodiments of the present invention relate to an apparatus and method for applying an antifoulant coating to a marine vessel by utilizing a plasma spray apparatus.

2. Description of the Related Art

Marine vessels accumulate biological growth, known as foulants, over time on surfaces that are in contact with water. Diverse species of hard and soft fouling organisms, such as barnacles, zebra mussels, algae, and slime, form colonies—particularly when a ship is docked—on underwater surfaces because each requires a permanent anchorage in order to mature and reproduce. Marine growth fouling adds weight to a ship, increases the amount of fuel consumed, and reduces its speed.

Historically, to combat the growth of marine foulants, the underwater surfaces of ships have been coated with antifoulant paints, which often include toxic materials to inhibit biological growth. Conventional antifoulant paint is applied by brush or roller. These methods create a hazard because they release toxic materials at the time of application. The antifoulant paints also create an environmental problem because they degrade over time releasing toxic materials into the water through which the ship travels. Furthermore, as a result of the breakdown of the antifoulant paint, the lifetime of the coating is severely diminished.

Recently, new marine antifoulant coatings have been developed that are non-toxic and have an increased lifetime. They are formed from powder-based covalently-bonded material and thus, have an extremely low rate of degradation, which also leads to greatly reduced toxic emissions. However, these coatings cannot be applied with traditional painting techniques of brushing or rolling.

SUMMARY OF THE INVENTION

Embodiments of the present invention solve the above-mentioned problems and provide a distinct advance in the art of applying marine antifoulant coatings. More particularly, embodiments of the invention provide a method and apparatus for applying powder-based marine antifoulant coatings.

Various embodiments of the present invention include a plasma spray apparatus that creates a combined plasma and antifoulant material stream that is sprayed onto a target surface, such as the hull of a ship. It includes a plurality of powder material couplings to receive pressurized polymer-based antifoulant coating material, as well as couplings for gas to create a plasma stream, gas to provide shielding of the coating stream, and input/output couplings for a liquid cooling system. The apparatus also includes a plasma generator, a plurality of heating elements, a plasma nozzle, a shield gas system, a forced air system, a vacuum system, a liquid cooling system, and an air inlet.

The plasma generator includes a chamber to store the gas as it is being ionized, a cathode and an anode both located in the chamber and operating in combination to ionize the gas and create a plasma stream, a passageway to connect the chamber to the plasma gas coupling, and an outlet to supply the plasma stream to the plasma nozzle.

Each heating element includes a powder material inlet connected to a powder material passageway which is in turn connected to a powder material coupling. The heating element also includes a gas inlet that receives gas flow from the plasma generator and controls the temperature of the element, as well as a gas outlet, connected to the plasma nozzle, that returns gas to the plasma stream. Furthermore, there is a powder material outlet, connected to the plasma nozzle downstream from the gas outlet, that injects coating material into the plasma stream.

The plasma nozzle includes a proximal end to receive the plasma stream from the plasma generator, a middle section that receives coating material from the heating element, and a distal end to guide the coating material onto the target surface.

The shield gas system includes an injector located near the distal end of the plasma nozzle that creates a gas stream which rotates about the longitudinal axis of the plasma nozzle. The injector receives gas from the shield gas coupling through a passageway.

The forced air system includes an inlet to receive pressurized air flow from an external source and a circumferential chamber connected to the inlet that surrounds the distal end of the plasma nozzle. The forced air system also includes a cooling air nozzle connected to the chamber that directs airflow onto the target surface.

The vacuum system includes a nozzle that removes fumes and stray particles which may reflect from the target surface. The swept-up particles and fumes spin around a circumferential air chamber before exiting the plasma spray apparatus through a vacuum outlet.

The liquid cooling system includes chambers to cool portions of the plasma generator and the heating elements as well as passageways to connect the chambers to each other and the liquid couplings.

The air inlet is an opening in the body of the apparatus that allows air to mix with the plasma stream.

Operation of the apparatus is as follows: A plasma stream is created by the plasma generator that ionizes gas received from an external source. Heat for the heating elements is received from a portion of the plasma stream that flows from the plasma generator through the heating elements and back into the plasma stream. Unheated, pressurized powder material flows from the powder material couplings to the heating elements where it is heated to a molten state and covalent bonding of a portion of the powder material occurs. The coating material is injected from the heating elements into the plasma stream, which guides the material onto the target surface. Shield gas is delivered by the shield gas system to encircle the plasma stream and coating material mixture so that the gas can cool the material and prevent any contamination of the coating material while the mixture is in flight. Ambient air is mixed with the plasma stream to prevent a flame condition in the plasma. Fumes and stray particles may be removed by a vacuum system. Finally, the coating material is cooled after it is applied to the target surface by a forced air system.

BRIEF DESCRIPTION OF THE DRAWING FIGURES

A preferred embodiment of the present invention is described in detail below with reference to the attached drawing figures, wherein.

Figure 2:
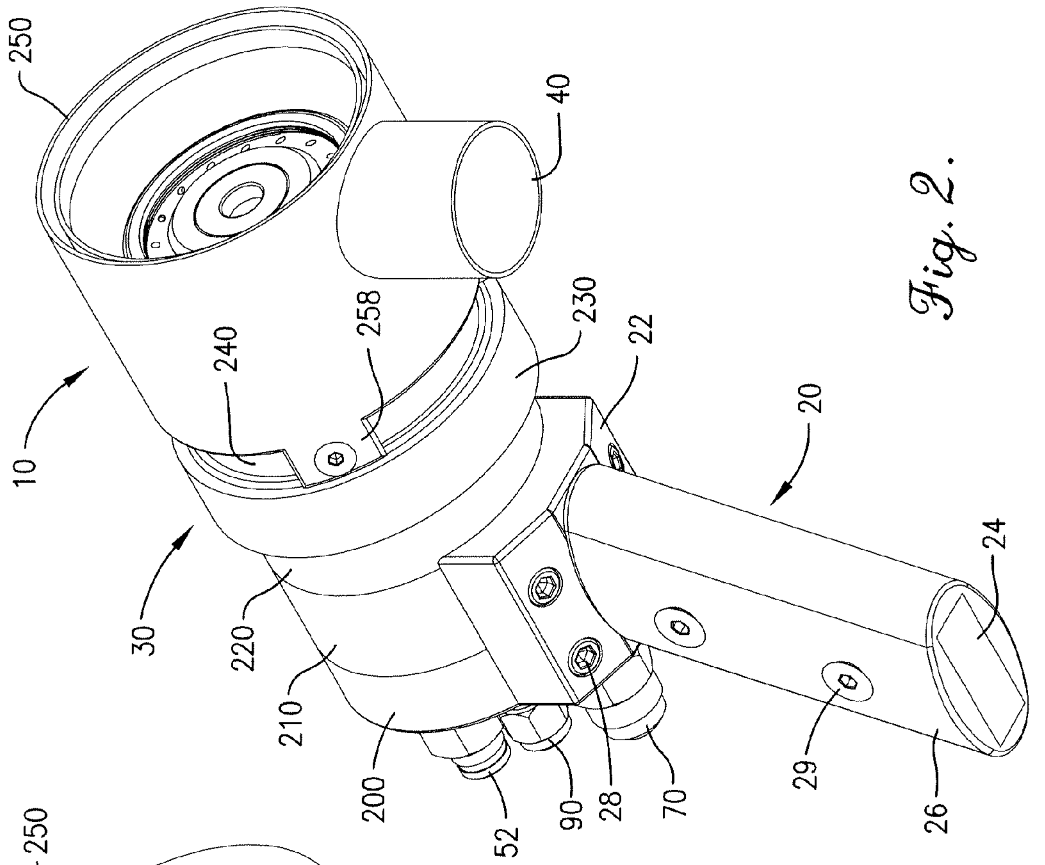
FIG. 2 is a front perspective view of the plasma spray apparatus.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
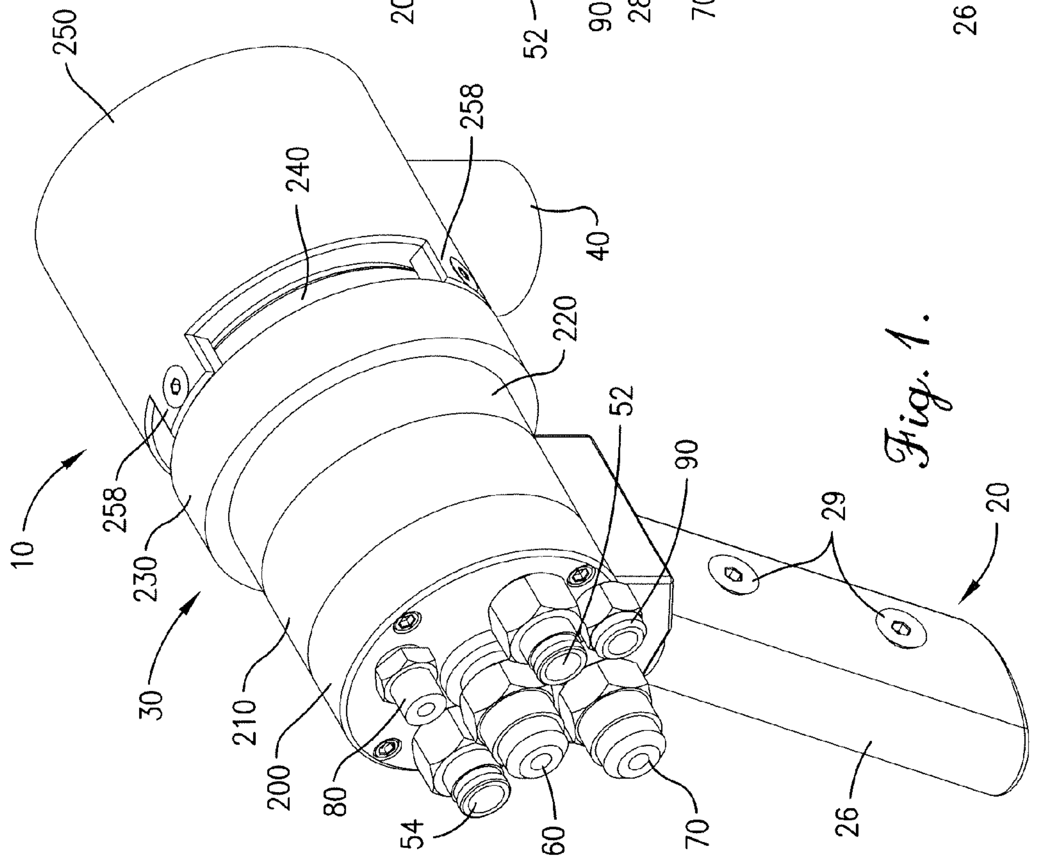
FIG. 1 is a rear perspective view of the plasma spray apparatus.

FIGS. 1 and 2 show one embodiment of the plasma spray apparatus 10. The apparatus 10 may be formed in the shape of a gun and includes a handle 20, a body 30, and a forced air inlet 40. The handle includes a first mount 22, a second mount 24, and a grip 26. The proximal end of the body 30 includes a plurality of couplings to connect the apparatus 10 with external sources for powder material, liquid, and gas. There are two powder material couplings 52, 54, one liquid input coupling 60, one liquid output coupling 70, one plasma gas coupling 80, and one shield gas coupling 90.

In various embodiments, the handle 20 is coupled to the body 30 near the proximal end of the body. The handle is approximately 1.25 inches in width, approximately 2 inches in depth, and extends approximately 3.5 inches from the body 30. The first mount 22 of the handle 20 may be attached to the body 30 through the use of a plurality of screws 28, as best seen in FIG. 2. However, other means of attachment are possible, such as epoxies or adhesives. The second mount 24 is attached to the first mount 22 through the use of a plurality of screws (shown in FIG. 6), although other means of attachment are possible. The grip 26 of the handle 20 is attached to the second mount 24 through the use of a plurality of screws 29, although other means of attachment are possible as well.

The first 22 and second 24 mounts of the handle 20 may be manufactured from aluminum, although other, preferably lightweight, metals are possible. The grip 26 of the handle may be manufactured from Acrylonitrile Butadiene Styrene (ABS), although other plastic and non-plastic materials are possible.

Figure 3:
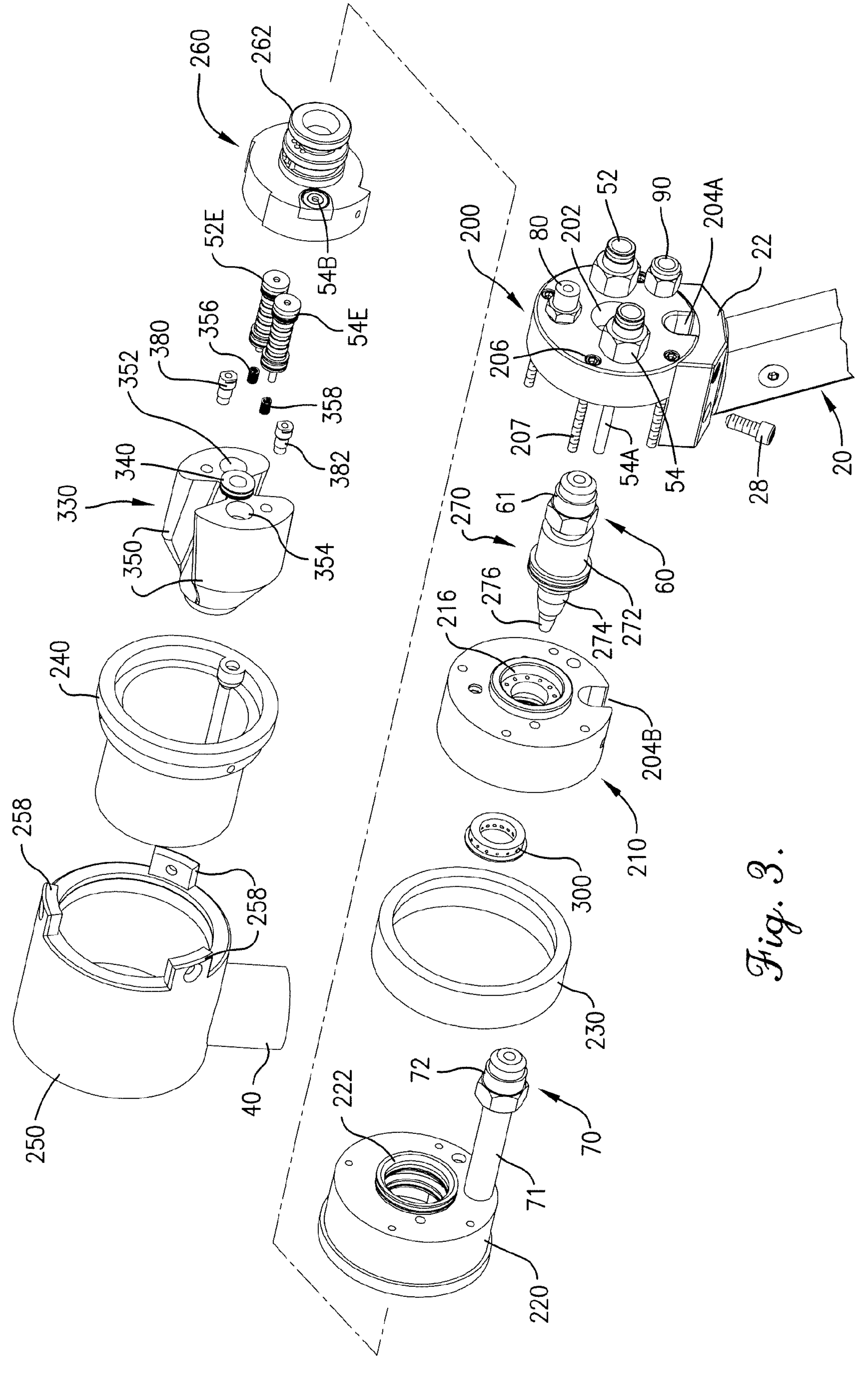
FIG. 3 is an exploded view of the plasma spray apparatus, viewed from the rear of the plasma spray apparatus.
Figure 4:
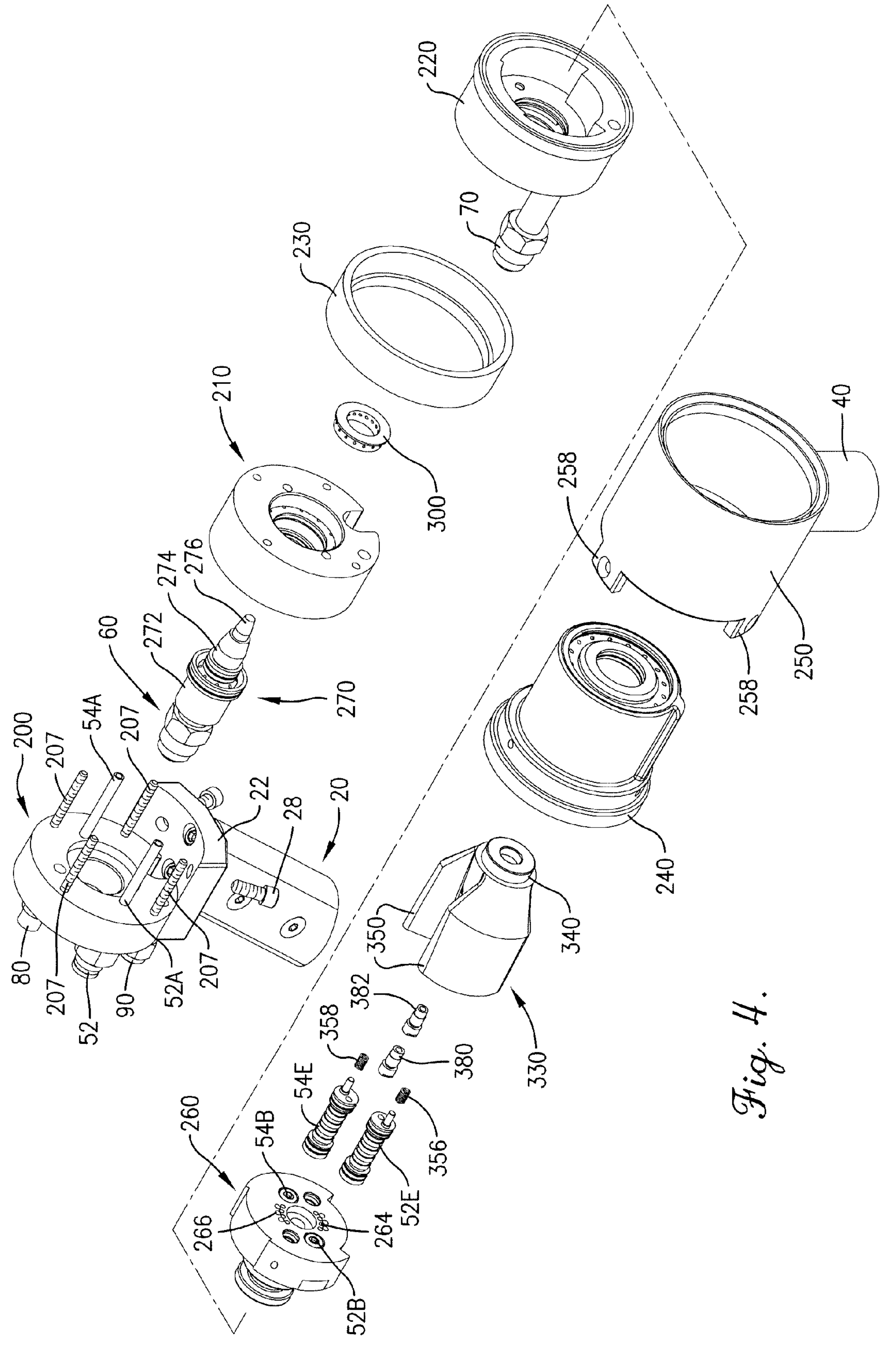
FIG. 4 is an exploded view of the plasma spray apparatus, viewed from the front of the plasma spray apparatus.
Figure 5:
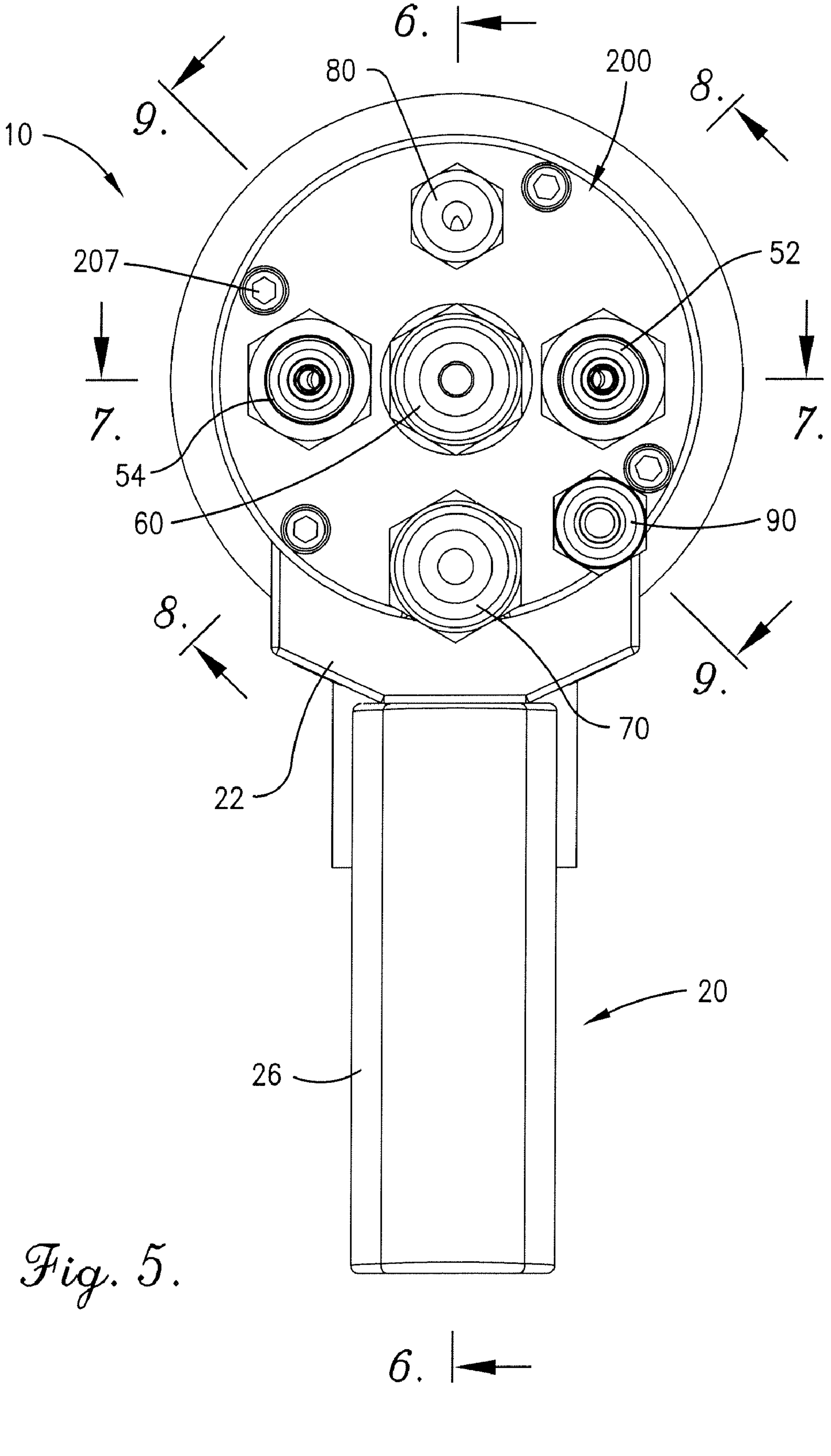
FIG. 5 is a rear plan view of the plasma spray apparatus, including notation of the following sectional views.

In various embodiments, the body 30 of the apparatus 10 is generally cylindrical in shape, is approximately 6.65 inches in length, and is approximately 3 inches in diameter. The body 30 comprises a plurality of subcomponents, as seen in FIGS. 3 and 4, including a rear housing assembly 200, a plasma gas distribution housing assembly 210, an anode power and liquid distribution assembly 220, a locking ring 230, a liquid shroud 240, and a forced air shroud 250.

In various embodiments, the rear housing assembly 200 is located at the proximal end of the body 30 of the apparatus 10 and is generally disc shaped, approximately 3 inches in diameter and 0.8 inches in thickness. The rear housing assembly 200 may be manufactured from garolite, although other materials are possible. It includes the couplings that connect the apparatus 10 to external sources for powder material 52, 54 and gas to be used for plasma 80 and for shielding 90. There are also openings 202, 204A in the rear housing assembly 200 to accommodate the liquid input 60 and output 70 couplings. In addition, there is an opening 204B in the plasma gas distribution housing assembly to accommodate a portion of the liquid output coupling 70.

Figure 6:
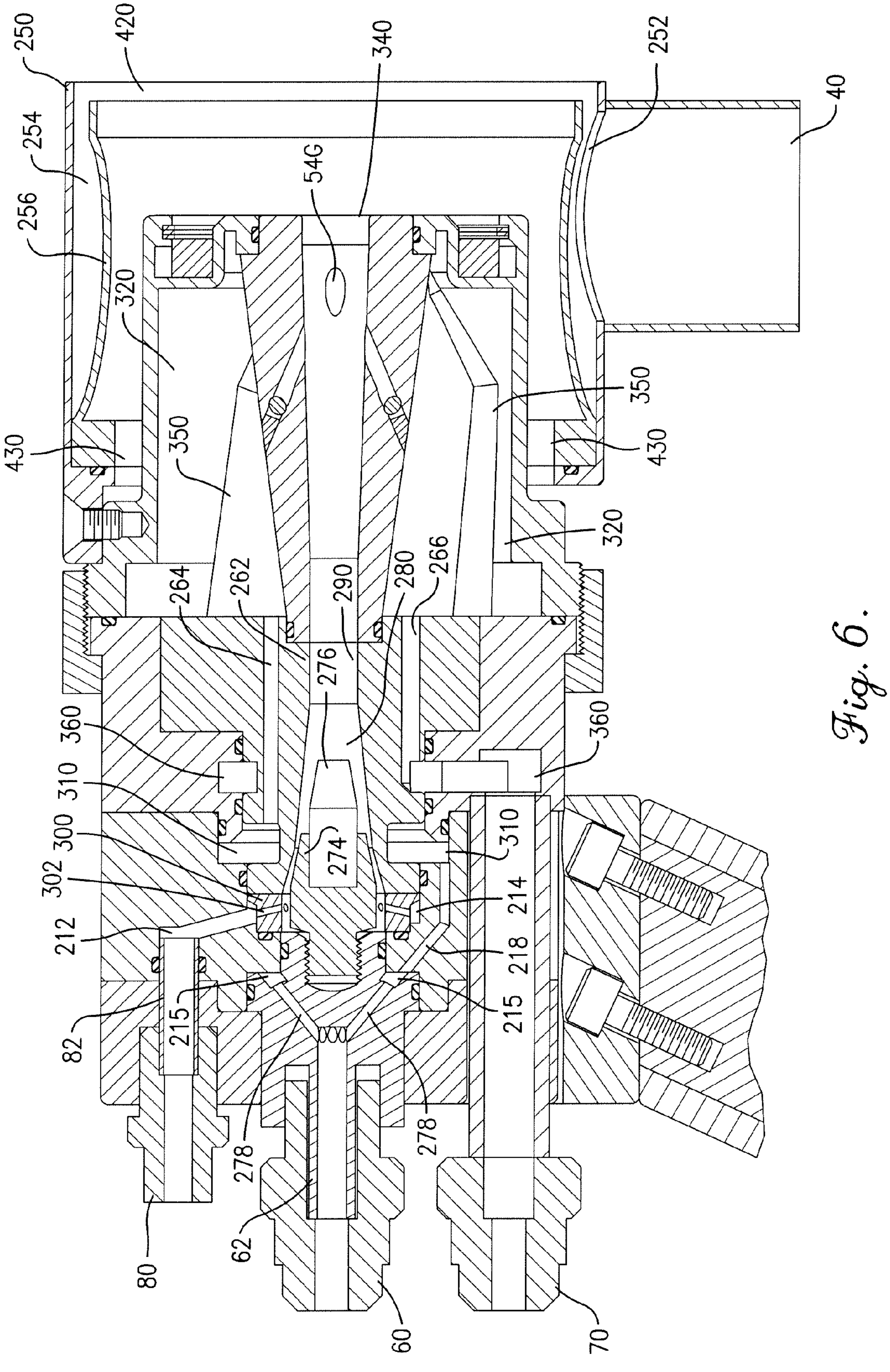
FIG. 6 is a sectional view of the plasma spray apparatus, highlighting the liquid cooling system and the plasma gas system.

For assembly purposes, there are a plurality of openings 206 in the rear housing assembly 200 for screws 207. The screws 207 hold the rear housing assembly 200 and the plasma gas distribution housing assembly 210 to the anode housing 220. Furthermore, the locking ring 230 couples the anode housing 220 to the liquid shroud 240, as shown in FIG. 6.

The powder material couplings 52, 54 generally provide the ability to connect the apparatus 10 to an external source of powderized polymer material. The couplings 52, 54 may be prestolok 2 couplings and a first end of the couplings 52, 54 may be mounted to the rear housing assembly 200 through threaded means. A second end of the couplings 52, 54 may attach to hoses that include complementary prestolok 2 couplings and are connected to an external source of powderized polymer material that is pressurized. The source is pressurized in order to move the powder material through the hoses and the apparatus 10 so that once the polymer material is heated, it can be injected into the plasma stream. The source, which may be a tank, should also be capable of retaining such a volume of powder material that can supply 100 pounds of material per hour to the apparatus 10.

The first end of the powder material couplings 52, 54 is also connected to a powder material tube 52A, 54A (best seen in FIG. 4) that provides a passageway for the powder material to travel from the couplings 52, 54 to an intermediate powder passageway 52B, 54B located in an anode assembly 260. The tubes 52A, 54A are approximately 2.55 inches in length and approximately 0.19 inches in diameter. The powder material tubes 52A, 54A may be manufactured from stainless steel, although other materials are possible. The intermediate powder passageways 52B, 54B may be metal-cast molded inserts that are brazed to the anode assembly 260 and may be manufactured from tungsten carbide.

In various embodiments, the other couplings that are mounted to the rear housing assembly 200 are the plasma gas coupling 80 and the shield gas coupling 90. Similar to the powder material couplings 52, 54, a first end of the gas couplings 80, 90 may be mounted to the rear housing assembly 200 through threaded means. A second end of the plasma gas coupling 80, which may be a vibra-lok fitting, is attached to a hose that includes a complementary vibra-lok fitting and is connected to an external source for plasma gas. The source gas for the plasma stream may be argon, when starting the apparatus, followed by nitrogen during normal operation. An alternative approach is to use only nitrogen for starting and normal operation. A second end of the shield gas coupling 90, which may be a presto-lok fitting, is attached to a hose that includes a complementary presto-lok fitting and is connected to an external source for shield gas. The source gas for the shield is typically nitrogen. Filtered, dry air may also be used for the shield, although nitrogen generally provides a gas stream that is freer of contaminates.

The liquid input coupling 60 is connected to a cathode assembly 270. The cathode assembly 270 includes a cathode distributor 272, a cathode mount 274, and a cathode 276. The liquid input coupling 60, the cathode distributor 272, and the cathode mount 274 may all be manufactured from oxygen free copper. The cathode 276 may be manufactured from tungsten.

In various embodiments, the cathode assembly 270 serves two purposes. One purpose is to provide a pathway for cooling liquid to enter the apparatus. A first end of the liquid input coupling 60 is attached to the cathode distributor 272. A second end of the liquid input coupling 60 includes a connector 61 that is attached to an external hose which is also connected to a supply of liquid, such that the liquid flows from the supply through the hose and into the apparatus 10 through the liquid input coupling 60. The supply of liquid is generally from an external container, such as a tank.

In various embodiments, the second purpose of the cathode assembly 270 is to provide an electrical voltage level, which is typically negative or electrical ground, to the cathode 276. The connector 61 may be manufactured from oxygen free copper and is generally electrically conductive. And the hose coupled to the connector 61 may also include an electrically conductive outer braiding that can be connected to an external electrical voltage source, such as a power supply. Furthermore, since all the components that are associated with the cathode 276—the cathode distributor 272 and the cathode mount 274—are generally electrically conductive as well, there is an electrically conductive path from the external electric power supply to the cathode 276 that allows the cathode 276 to be set to a desired voltage level.

The liquid output coupling 70 may be connected at a first end to the anode housing 220 through a liquid output tube 71. At a second end, the coupling 70 also includes a liquid output connector 72. Both the tube 71 and the connector 72 may be manufactured from oxygen free copper. The liquid output connector 72 may also attach to an external hose which is also coupled to a supply of liquid, such that the liquid flows out from the apparatus 10 through the liquid output coupling 70 and back to the supply through the hose. The supply of liquid is generally from a tank, and may be the same tank that is used for the cooled liquid input as discussed above. In this fashion, the liquid for cooling the apparatus 10 may be recirculated.

In various embodiments, the anode housing 220 serves two purposes in a similar manner to the cathode assembly 270. The first purpose is to provide an output path for the cooling liquid to exit the apparatus 10 and return to the external recirculating tank. Likewise with the cathode assembly 270, the second purpose of the anode housing 220 is to provide an electrical voltage level, which is typically positive, to an anode 262. The anode housing 220 is generally annular-shaped with a central opening 222 and may be manufactured from aluminum. The housing 220 has a thickness of approximately 1 inch with an outer diameter of approximately 3 inches and an inner diameter of approximately 1.19 inches. The anode 262 is located on the anode assembly 260 and fits in the central opening 222 of the anode housing 220 such that the anode 262 makes contact with the housing 220. The anode 262 may be manufactured from a metal such as oxygen free copper. The external hose that couples with the liquid output connector 72 to return liquid to the external liquid source may also include an electrically conductive outer braiding that can be connected to an external electrical voltage source, such as a power supply—generally the same power supply that is used with the cathode 276. And as with the cathode 276, there is an electrically conductive path from the power supply through the external hose, the liquid output connector 72, the liquid output tube 71, and the anode housing 220 in order to supply a desired voltage level to the anode 262.

In various embodiments, once the apparatus 10 is assembled, a plasma gas chamber 280 is formed (best seen in FIG. 6) between the inner wall of the anode 262, the cathode mount 274, and the cathode 276. In the chamber 280, a small gap exists between the cathode 276 and the anode 262. The application of a voltage across the gap between the cathode 276 and the anode 262 ionizes the gas in the chamber 280 to create a plasma generator 290.

As shown in FIG. 6, in various embodiments, the plasma generator 290 may include the plasma gas coupling 80 which is attached to a tube 82 that provides a path for the plasma gas to flow from the coupling 80 to a plasma gas delivery passageway 212 within the plasma gas distribution housing assembly 210, which may be manufactured from garolite. A plasma gas distributor 300 may be inserted between the anode 262 and the plasma gas distribution housing assembly 210. The plasma gas distributor 300 may be manufactured from boron nitride material and is generally annular-shaped, with an inner ring and an outer ring, and includes a plurality of injection vents 302 that extend through the body of the distributor 300 from the inner ring to the outer ring at an angle of approximately 45°. A small, circular plasma pre-injection chamber 214 exists in the gap between the circumference of the plasma gas distributor 300 and the portion of the plasma gas distribution housing assembly 210 into which the distributor 300 fits.

Also shown in FIG. 6, the liquid input coupling 60 may connect to a liquid input tube 62 within the cathode assembly 270. The tube 62 terminates into a plurality of first cathode liquid distribution passageways 278. The first cathode liquid distribution passageways 278 extend radially outward from the liquid input tube 62 to the outer surface of the cathode distributor 272. The first cathode liquid distribution passageways 278 feed into an intermediate liquid input chamber 215 that is created between the outer surface of the cathode distributor 272 and a liquid receiving ring 216 of the plasma gas distribution housing assembly 210. A plurality of second cathode liquid distribution passageways 218 are located in the plasma gas distribution housing assembly 210 and extend from the intermediate liquid input chamber 215 to a first liquid cooling chamber 310.

In various embodiments, the first liquid cooling chamber 310 is generally annular shaped and bounded on its inner portion by the anode 262, while the outer portion of the first liquid cooling chamber 310 is bounded by a portion of the plasma gas distribution housing assembly 210 and the anode housing 220. Given the close proximity of the first liquid cooling chamber 310 to the anode 262, the chamber 310 serves to cool at least a portion of the plasma generator 290. Within the anode assembly 260, there are a plurality of anode liquid input passageways 264 that allow liquid to pass from the first liquid cooling chamber 310 to a second liquid cooling chamber 320.

In various embodiments, the second liquid cooling chamber 320 is roughly cylindrical shaped, wherein the outer bound of the chamber 320 is the inner portion of the liquid shroud 240. The inner bound of the second liquid cooling chamber 320 is a plasma nozzle assembly 330. The plasma nozzle assembly 330 includes a plasma nozzle 340 and a heating element 350. The heating element 350 includes first and second heating chambers 352 and 354. Liquid in the second liquid cooling chamber 320 cools at least a portion of the heating element 350. There are a plurality of anode liquid output passageways 266 also contained within the anode assembly 260. The anode liquid output passageways 266 allow liquid to exit the second liquid cooling chamber 320 and flow into a third liquid cooling chamber 360.

In various embodiments, the third liquid cooling chamber 360 is generally annular shaped and bounded on the inner portion by the anode 262, while being bounded on the outer portion by the anode housing 220. Liquid circulating in the third liquid cooling chamber 360 cools a portion of the anode 262. The third liquid cooling chamber 360 couples with the liquid output tube 71 near the bottom of the chamber 360 to allow liquid to exit the chamber 360 and flow out of the apparatus 10 through the liquid output coupling 70.

In other embodiments, it is possible that the electric voltage supply connections 61, 72 as well as the electrically conductive path for the anode 262 and the cathode 276 are separate from the liquid supply system, including couplings 60, 70 and tubes 62, 71. It is possible that individual conductors, such as wires, may be connected to the anode 262 and the cathode 276 and further connected to a terminal on the body 30 or perhaps the handle 20 to which an external conductive cable, such as a power cord, may be connected.

Figure 7:
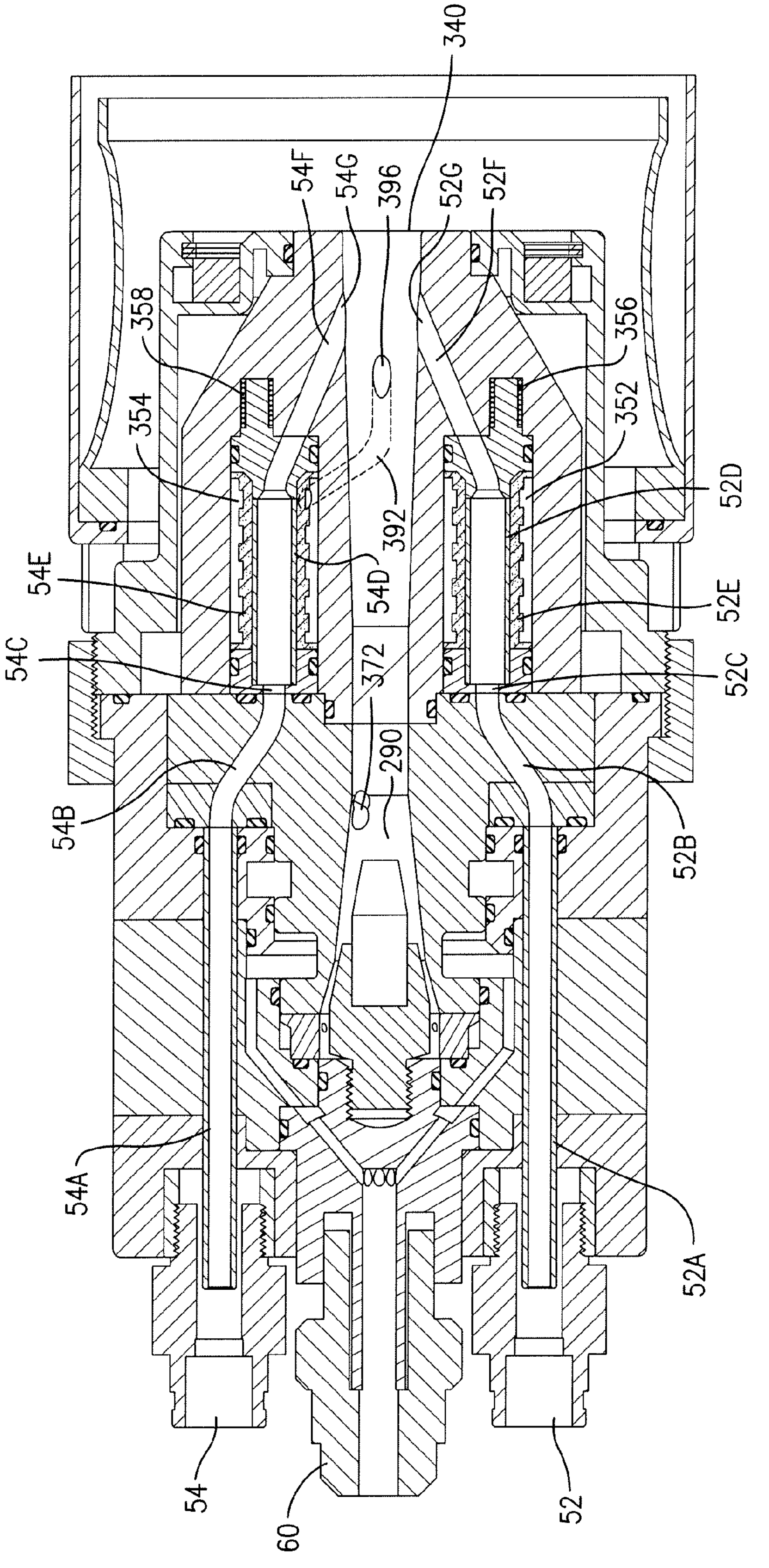
FIG. 7 is a sectional view of the plasma spray apparatus, highlighting the powder injection and heating system.

As shown in FIG. 7, in various embodiments, there are two paths that the powder material may travel through the apparatus 10. Pressurized powder material from an external source may enter the apparatus 10 through powder material couplings 52, 54 and continue through powder material tubes 52A, 54A and intermediate powder passageways 52B, 54B, that are located within the anode assembly 260. The heating element 350 is coupled to the anode assembly 260 such that the intermediate powder passageways 52B, 54B mate with powder material inlets 52C, 54C. The powder material inlets 52C, 54C provide access to mixing tubes 52D, 54D that are contained within powder melting chambers 52E, 54E. The mixing tubes 52D, 54D may be manufactured from Ferric or Austenitic stainless steel or a high conductive material such as indium oxide, while the powder melting chambers 52E, 54E may be manufactured from boron nitride material. Coupled to the mixing tubes 52D, 54D are powder material outlets 52F, 54F, which connect to powder material openings 52G, 54G in the plasma nozzle 340 near the distal end of the nozzle 340. At the far end of the powder melting chambers 52E, 54E are springs 356, 358 that provide a force to help ensure a good connection between the powder material inlets 52C, 54C and the intermediate powder passageways 52B, 54B.

Figure 8:
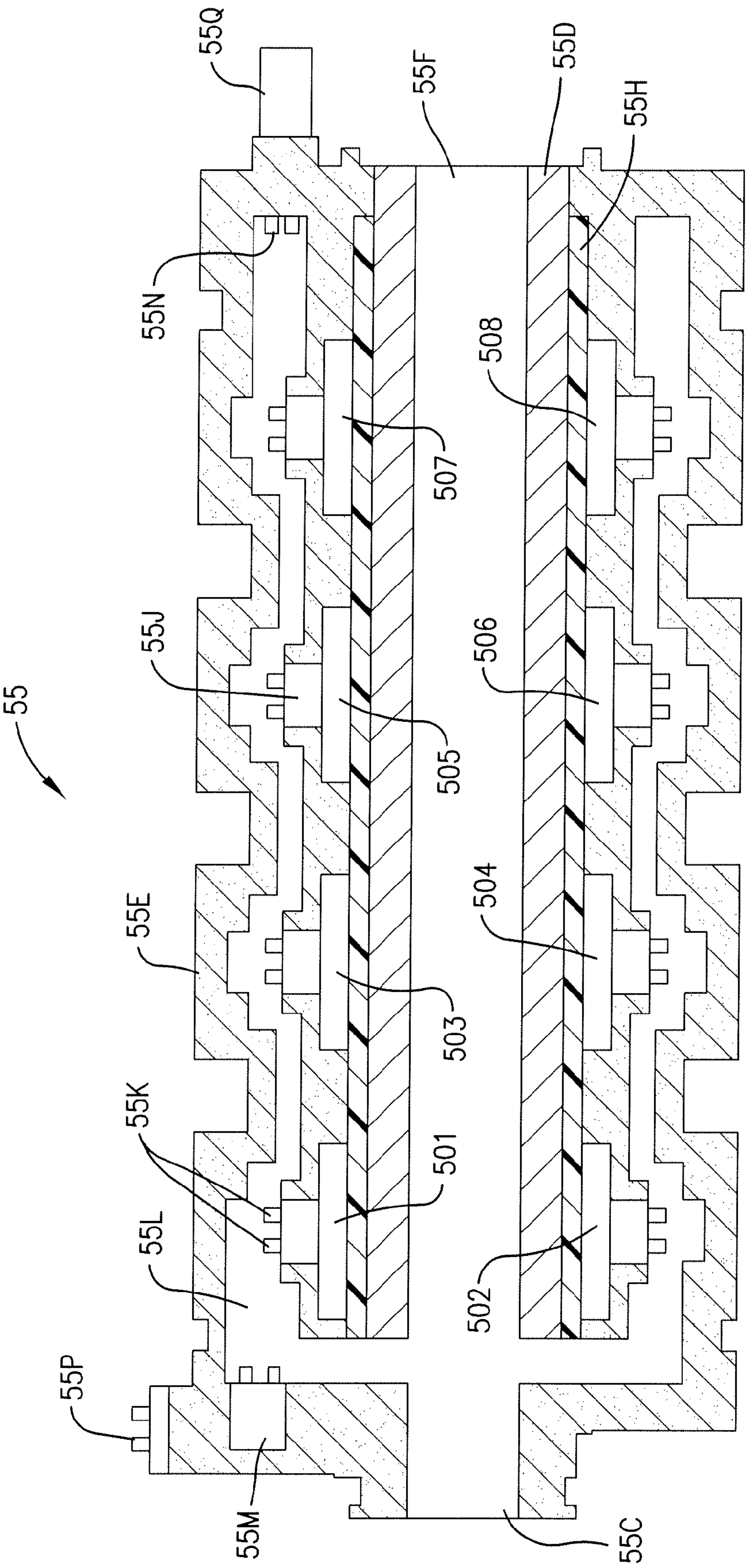
FIG. 8 is a sectional view of the electrophoresis element.

In another embodiment, as shown in FIG. 8, an electrophoresis element 55 is of similar shape and structure to the powder melting chambers 52E, 54E and in certain embodiments, it occupies the same location as each one of the powder melting chambers 52E, 54E within heating chambers 352, 354. The electrophoresis element 55 includes a powder material inlet 55C, a mixing tube 55D, which may be manufactured from Ferric or Austenitic stainless steel or a high conductive material such as indium oxide, and an outer shell 55E in a similar fashion to the powder melting chambers 52E, 54E. The mixing tube 55D may be manufactured from stainless steel and the outer shell 55E may be manufactured from boron nitride ceramic. Thus, from a structural standpoint, the electrophoresis element 55 is interchangeable with the powder melting chambers 52E, 54E, in that the electrophoresis element 55 provides essentially the same path for the powder material to flow through the apparatus 10.

The electrophoresis element 55 also includes a secondary tube 55H, manufactured from teflon, that surrounds the mixing tube 55D. Coupled to the secondary tube 55H is a plurality of driving electrodes 55J, each of which may be manufactured from indium tin oxide. In various embodiments, there may eight driving electrodes 501-508 total, with four driving electrodes 501, 503, 505, 507 equally spaced and aligned longitudinally on one side of the secondary tube 55H and four driving electrodes 502, 504, 506, 508 similarly spaced and aligned on the opposite side of the tube 55H. Eight driving electrodes 55J are optimal, although there may be greater or fewer than eight. Additionally, the driving electrodes 55J may be implemented in a different orientation, rather than 180° apart in order to vary the effects that the driving electrodes 55J have on the powder material.

Each driving electrode 55J may also include a pair of electrode terminals 55K, wherein one of the electrode terminals 55K is connected through a wiring passageway 55L to a first voltage distribution terminal 55M and the other electrode terminals 55K is connected to a second voltage distribution terminal 55N. This connection scheme allows each driving electrode 55J to be driven to either a first voltage level or a second voltage level. Typically, the first voltage distribution terminal 55M is connected to a positive voltage source and the second voltage distribution terminal 55N is connected to a relatively negative voltage source or to electrical ground. Thus, each driving electrode 55J can be driven to a positive voltage or to ground. The first voltage distribution terminal 55M is connected internally to a power supply terminal assembly 55P, which is connected to a positive power supply terminal located external to the apparatus 10. The second voltage distribution terminal 55N is connected internally to a grounding assembly 55Q, which may be connected to ground through the chassis of the apparatus 10 to the connector 61 that supplies a voltage level to the cathode 276.

Supplying the power to the power supply terminal assembly 55P may be an electrophoresis sequence controller typically located external to the apparatus 10. The electrophoresis sequence controller is utilized to set the timing and dynamic characteristics of the electrophoresis element 55 by controlling the magnitude and the duration of the voltage that is applied to each pair of electrodes 55J. Therefore, the electrophoresis sequence controller should be able to switch or pulse the output voltage at a desired frequency. As a result, the electrophoresis sequence controller may be coupled with a power supply to source the necessary voltage and current levels and may include a processing element coupled with a memory element, such as a computer that may execute one or more programmable code segments. The electrophoresis sequence controller may also include programmable logic hardware such as, but not limited to, microprocessors, microcontrollers, field programmable gate arrays (FPGAs), programmable logic devices (PLDs), application-specific integrated circuits (ASICs), or any combination thereof.

It is possible that the timing and sequence control functioning may be separated from the power supply and integrated within the body 30 of the apparatus 10 as space and performance influencing concerns, such as thermal and radiation shielding, allow. In this embodiment, the power supply is coupled to the power supply terminal assembly 55P and the circuitry necessary to control the timing of energizing the driving electrodes 55J is located within the electrophoresis element 55.

The electrophoresis element 55 further includes a powder material outlet 55F which may connect to the powder material outlets 52F, 54F and the powder material openings 52G, 54G within the heating element 350.

Figure 9:
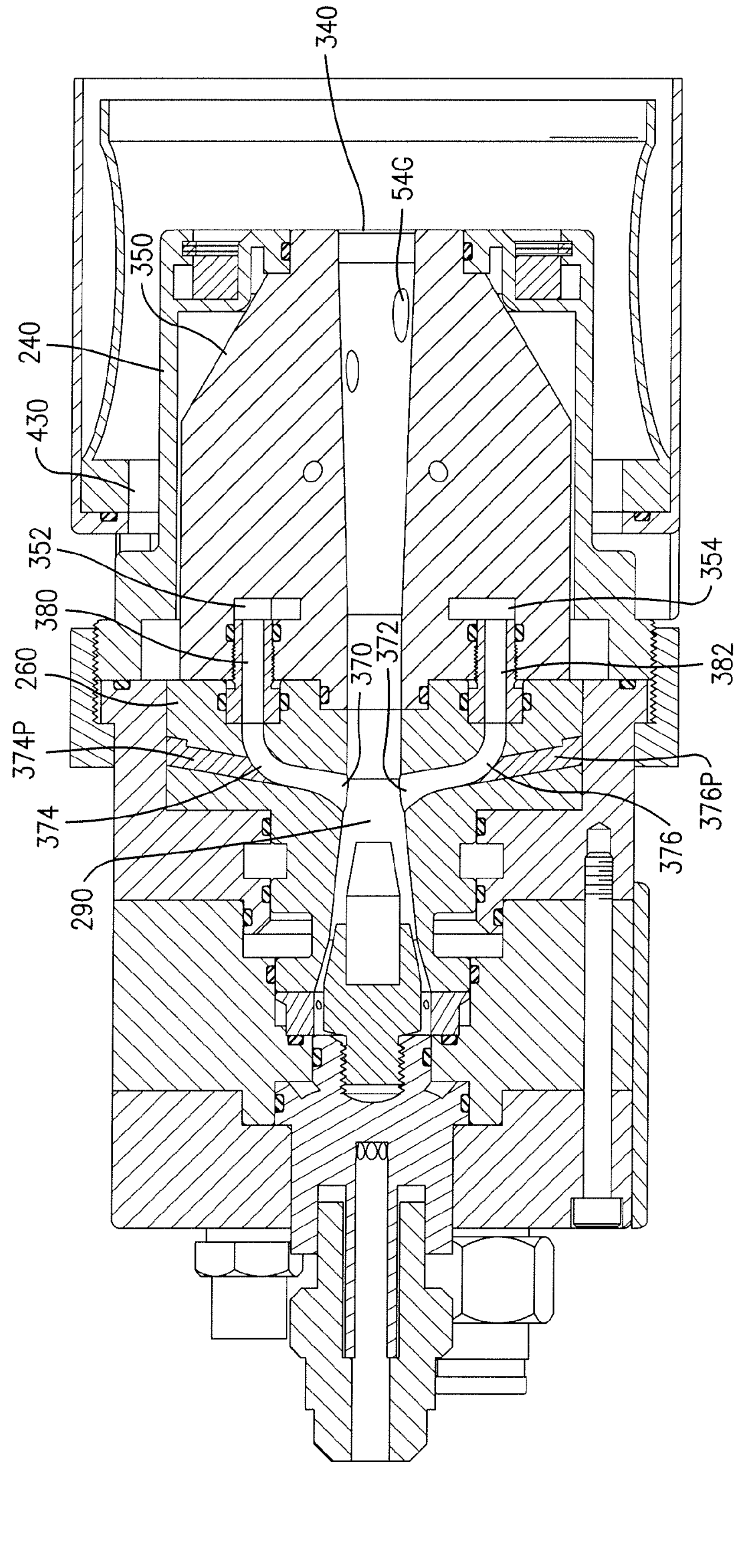
FIG. 9 is a sectional view of the plasma spray apparatus, highlighting the plasma injection path to the heating system.

As shown in FIG. 9, in various embodiments, just downstream from the plasma generator 290, within the anode assembly 260, are auxiliary plasma inlet openings 370, 372 which feed auxiliary plasma passageways 374, 376. The auxiliary plasma passageways 374, 376 couple with plasma inlets 380, 382, which control the volume of plasma gas flow into heating chambers 352, 354 within the heating element 350 and thereby the inlets 380, 382 can be varied in size to control the temperature of the chambers 352, 354. The plasma inlets 380, 382 may be cylindrical in shape and manufactured from ceramic materials. The heating chambers 352, 354 exhaust plasma through plasma outlets 390, 392 and plasma outlet openings 394, 396 (best seen in FIG. 7) in the plasma nozzle 340 to rejoin the plasma stream from the plasma generator 290. Also shown in FIG. 9 are plugs 374P, 376P that are required to fill in the void left by drilling into the anode assembly 260 in order to create the curved portion of the auxiliary plasma passageways 374, 376.

In various embodiments, the plasma nozzle assembly 330 may be coupled to the anode assembly 260. Specifically, the proximal end of the plasma nozzle 340 may be coupled to the distal end of the plasma generator 290 through threaded means but other methods of attachment are possible. The nozzle 340 is approximately 2.775 inches in length and may be manufactured from oxygen free copper. The plasma nozzle 340 may be operable to receive the plasma stream from the plasma generator 290. Near the distal end of the plasma nozzle 340, there are openings 394, 396 for exhaust plasma outlets 390, 392 and, a little farther downstream, powder material openings 52G, 54G for powder material outlets 52F, 54F. Both sets of outlets 52F, 54F and 390, 392 are angled with respect to the longitudinal axis of the plasma nozzle 340.

In various embodiments, the diameter of the opening of the distal end of the plasma nozzle 340, where the plasma and coating material stream exits, is approximately 0.687 inches. This is a larger spray pattern version of the apparatus 10. In other embodiments, the diameter of the opening of the distal end of the plasma nozzle 340 is approximately 0.438 inches. This is a smaller spray pattern version of the apparatus 10. The user can choose which spray pattern size is appropriate, depending on the size of the subject and the application for the apparatus 10.

Figure 10:
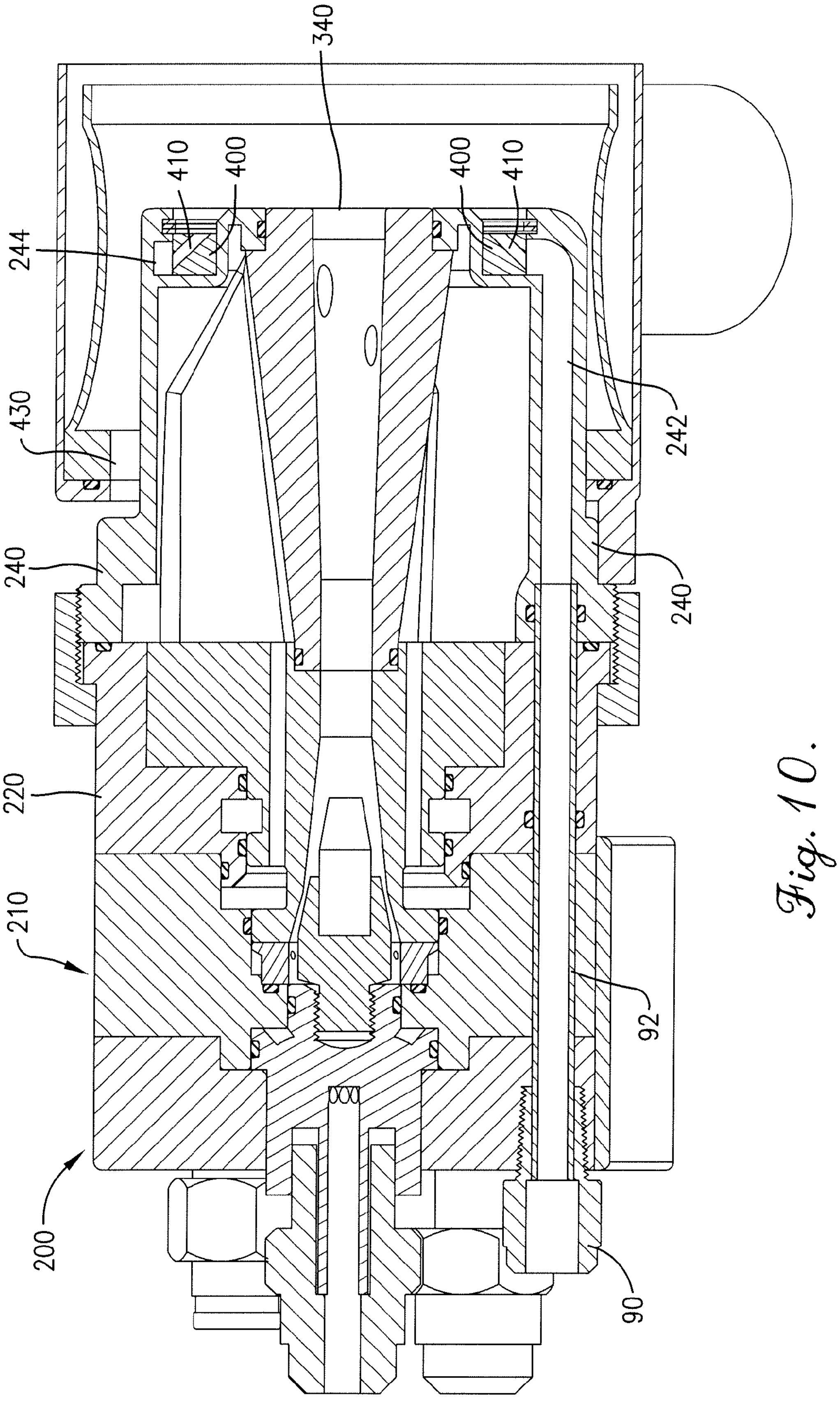
FIG. 10 is a sectional view of the plasma spray apparatus, highlighting the shield gas system.

Referring to FIG. 10, the shield gas coupling 90 may be attached to the rear housing assembly 200 through threaded means. The shield gas coupling 90 also attaches to a shield gas tube 92, which extends through holes in the rear housing assembly 200, the plasma gas distribution housing assembly 210, and the anode power and liquid distribution assembly 220 until the tube 92 couples with a shield gas passageway 242 within the liquid shroud 240. The shield gas passageway 242 couples with a circular shield gas chamber 244, which is located at the distal end of the liquid shroud 240. The inner portion of the shield gas chamber 244 contacts a shield gas injector 400. The shield gas injector 400 is annular-shaped, approximately 2.125 inches in diameter and may be manufactured from boron nitride. The shield gas injector 400 includes a plurality of evenly-spaced shield gas injector passageways 410 that extend from the outer circumference of the injector 400 to the front face of the injector 400 at an angle of approximately 45°. The shield gas injector passageways 410 also extend laterally at an angle of approximately 45° with respect to a radial line from the center of the shield gas injector 400. As a result, gas in the shield gas chamber 244 passes through the shield gas injector 400 at an angle to create a vortex of shield gas that encircles the plasma and coating material stream that is exiting the plasma nozzle 340.

As shown in FIG. 6, a forced air inlet 40 may be coupled to a forced air inlet opening 252 in the forced air shroud 250. The diameter of the forced air inlet 40 and the forced air inlet opening is approximately 1.36 inches. A hose may be attached to the forced air inlet 40 to supply compressed air from an external source to the apparatus 10. The forced air inlet 40 is in communication with a circumferential air chamber 254, which surrounds a venturi tube 256. The venturi tube 256 resides within the forced air shroud 250 and is roughly cylindrical in shape wherein the tube 256 is of a first diameter at a first end of the tube 256, of decreasing diameter toward the center of the tube 256, and of a second diameter at the second end of the tube 256 that is greater than the diameter of the center but less than the diameter of the first end of the tube 256. Thus, the sides of the venturi tube 256 appear to be curved. The venturi tube 256 is positioned within the forced air shroud 250 such that the first end of the tube 256 makes contact with the inner wall of the shroud 250, the center of the tube 256 forms the circumferential air chamber 254, and the second end of the tube 256 allows air to escape the chamber 254. Forced air leaving the circumferential air chamber 254 flows through a cooling nozzle 420, located at the distal end of the forced air shroud 250. The cooling nozzle 420 surrounds both the shield gas injector 400 and the plasma nozzle 340 in addition to sharing the same longitudinal axis with both the injector 400 and the nozzle 340. Furthermore, forced air leaves the cooling nozzle 420 just downstream from the plasma nozzle 340.

The circumferential forced air system may also be used in a vacuum mode. Instead of using an air compressor to force air into the forced air inlet 40, a multi-purpose compressor/vacuum system, or possibly a vacuum only system, is connected through a hose to the forced air inlet 40. The structure of the apparatus 10 remains the same, however, the cooling nozzle 420, in this embodiment, may be used to remove, by vacuum, minute sized rebound particles, and fumes during application of the coating.

Also shown in FIG. 6, there may be an air-plasma mixture inlet 430 in the gap between the forced air shroud 250 and the liquid shroud 240. As best seen in FIG. 3, there may be three tabs 258 that extend from the rear of the forced air shroud 250. The tabs 258 mate with a ring around the outer circumference of the liquid shroud 240. The tabs 258 are of such a length as to ensure a gap for the air-plasma mixture inlet 430 between the rear opening of the forced air shroud 250 and the outer circumference of the liquid shroud 240. The air-plasma mixture inlet 430 allows ambient air to enter the interior of the forced air shroud 250 to assist in cooling the liquid shroud 240 components and to mix with the plasma and coating material stream to prevent a flame condition in the stream as it exits the plasma nozzle 340.

Figure 11:
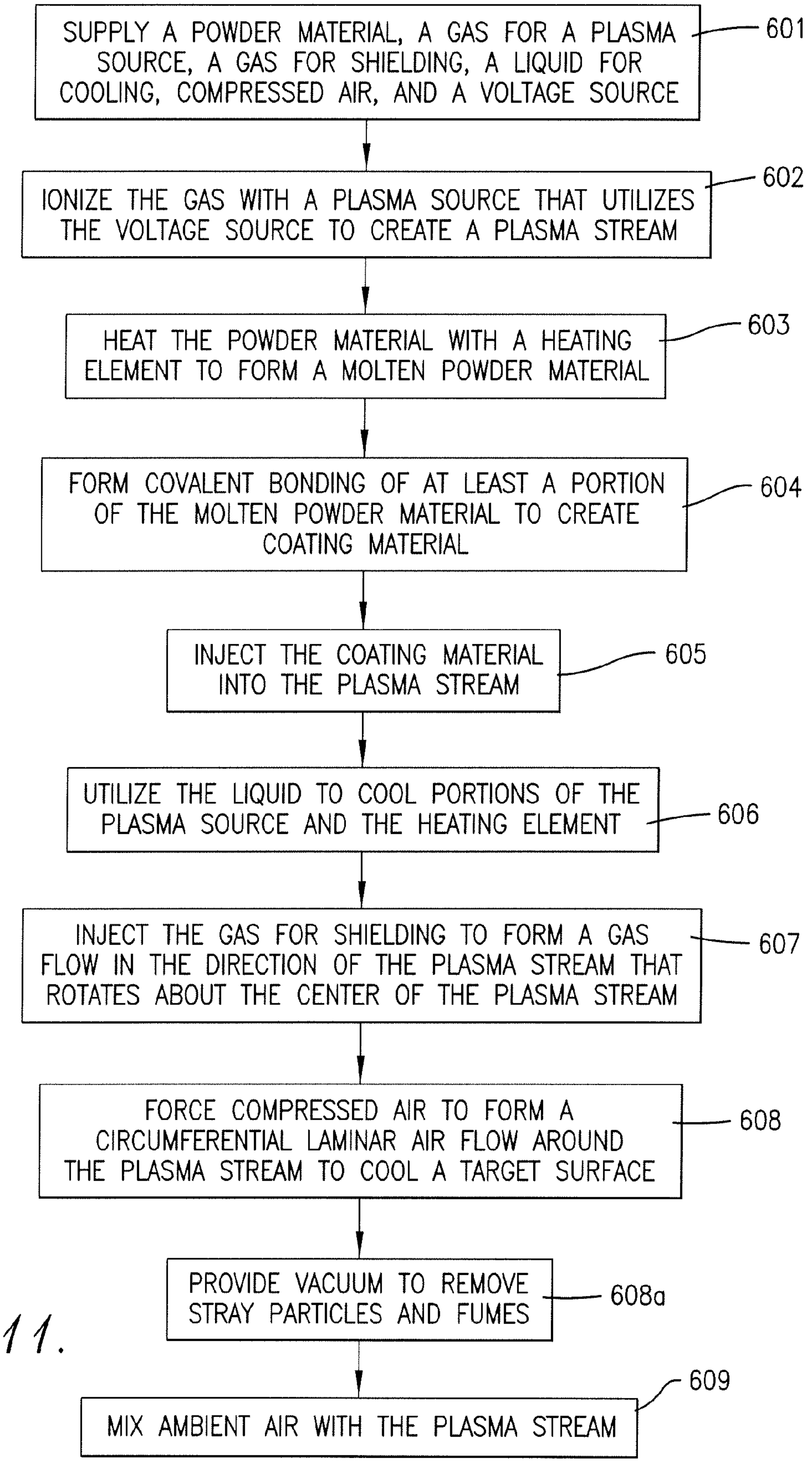
FIG. 11 is a flow diagram showing the method of operation of the plasma spray apparatus.

The operation of the apparatus 10 follows the steps as listed in FIG. 11. It is assumed that the target surface is free of any debris, oils, films, or other inhibitors that would interfere with the application of a coating material. Otherwise, the target surface should be appropriately cleaned before implementing the following steps.

Step 601 is to supply a powder material, a gas for a plasma generator, a gas for shielding, a liquid for cooling, compressed air and vacuum, a first and a second voltage source, and an electrophoresis sequence controller. The apparatus 10 utilizes a plurality of materials from external sources in order to apply a coating to a target surface. These materials are generally delivered to the apparatus 10 through hoses, tubes, or cables that are attached directly to the apparatus 10. Given the nature of applying a coating to a large surface, such as the hull of a marine vessel, it is possible that the hoses, tubes, and cables would have to be of considerable length. It is also possible that the sources of the raw materials would have to be mobile as well to follow the apparatus 10 during the application process, if necessary.

The components of the powder material vary with the application for usage of the apparatus 10. The apparatus 10 can be utilized to apply a variety of coating materials to a variety of surfaces, structures, or objects. As disclosed currently, the apparatus 10 may be used to apply an antifoulant coating to the underwater surfaces of marine vessels, such as boats or ships. But, with variations in the powder mixture, the apparatus 10 may be used to apply coatings to the external surfaces of vehicles or structures exposed to the environment to provide protection against rust or other corrosion. Or, with other powder mixture components, the apparatus 10 may be used to apply coatings to various objects or materials, such as cardboard, to increase the mechanical strength of the outer layers of such items.

Generally, the components of the powder material for creating a marine antifoulant coating include a polymer, a marine biocide, and a fungicide. The polymer may be a polyamide, such as nylon, or may be another polymer, such as polyvinylidene fluoride. Typically, a polymer is used that has a lower melting point than the other components included in the powder mixture. Thus, the polymer melts and forms covalent bonds with the other components before the other components begin to melt. This is because the polymer is used partly as a means to hold the other components to the chosen target surface without changing the properties of the other components. The marine biocide may be copper oxide, also known as cuprous oxide, or other agents that are operable to inhibit growth of marine foulants such as slime and algae. The fungicide may be zinc omadine, or an antimicrobial/preservative such as Vancide® 89. Other components, such an antimicrobial, may be added to this fundamental mixture to create a coating with different properties. In addition, each of the components may have a positive or negative net electrical charge.

The components of the powder mixture may be combined as follows: approximately 50% by weight of the marine biocide, approximately 46% by weight of the polymer, and approximately 4% by weight of the fungicide. Variations to this mixture ratio are possible while maintaining the desired properties of the coating. The mixture may be blended for approximately 2 minutes in an external high-speed, water-cooled blender to achieve proper consistency. It is also possible that a carrier gas of methane is added to the powder material in order to promote separation and orientation of the powder material components during the heating and covalent bonding phase. The blended powder mixture may then be loaded into an external powder feeding mechanism that is operable to supply a pressurized powder mixture to the apparatus 10 through hoses that are attached to the powder material couplings 52, 54.

The gas for the plasma generator may be nitrogen, wherein the plasma generator starts with nitrogen and operates thereafter with nitrogen. But, more typically, the plasma generator may start with argon and operate thereafter with nitrogen. The gas for the plasma is usually stored in an external pressurized tank and supplied to the apparatus 10 through a hose that is attached to the plasma gas coupling 80.

The gas for the shielding may nitrogen or clean, dry ambient air. Nitrogen is typically used over ambient air because nitrogen is generally freer of contaminants that may be found in ambient air. As with the gas for the plasma, the shielding gas is usually stored in an external pressurized tank and supplied to the apparatus 10 through a hose that is attached to the shield gas coupling 90.

The liquid for the cooling system may be water, although it is possible that other cooling liquids or refrigerants may be used. Generally, the liquid is housed in an external tank that includes a temperature-controlled chilling unit that maintains the temperature of the liquid to be approximately 70° F. Typically, the tank recirculates the liquid that is used to cool the apparatus 10. Thus, a hose is connected from the output of the tank to the liquid cooling input 60 of the apparatus 10. And, a hose is connected from the liquid cooling output 70 of the apparatus 10 to the input of the tank.

Compressed air may be used for the forced air system that is utilized to cool the coating material on the target surface. Compressed air may be delivered from an external air compressor to the apparatus 10 through a hose that is connected to the forced air inlet 40.

An external power supply may be utilized to supply the voltage source necessary to ionize the gas that creates the plasma stream. Connections to the power supply are generally achieved by utilizing hoses for the liquid cooling system that have an electrically conductive, such as braided metal, outer sleeve. The hoses may be connected to the conductive connectors 61, 72 for the liquid cooling input and output, which also provide conductive pathways for both the anode 262 and the cathode 276. The anode 262 generally receives a positive voltage. Thus, the hose connected to the liquid output connector 72 should be connected to the positive terminal of the power supply. The cathode 276 generally receives a negative voltage or ground. Therefore, the hose connected to the liquid input connector 61 should be connected to the negative or ground terminal of the power supply. The voltage level of the electric power supply may be set to approximately 30 Volts with an anticipated current flow of approximately 550-600 Amps.

The electrophoresis sequence controller is typically located external to the apparatus 10 and is connected to the power terminal assembly 55P to control the timing of the electrophoresis process and should be able to source up to 12 kiloVolts and up to 300 milliAmps. The electrophoresis sequence controller should also be able to switch the voltage output at a frequency of up to 10 kiloHertz.

Step 602 is to ionize the gas with a plasma generator that utilizes the voltage source to create a plasma stream. The pressurized gas from the external source enters the apparatus 10 through the plasma gas coupling 80, the plasma gas tube 82, and the plasma gas delivery passageway 212, and fills the circular plasma pre-injection chamber 214 that surrounds the plasma gas distributor 300. Pressure from the external gas source then forces the gas through the plasma injection vents 302 that exist within the plasma gas distributor 300. Due to the angled nature of the injection vents 302, gas is injected into the plasma gas chamber 280 such that it encircles the cathode mount 274 and creates a vortex around the cathode 276. The voltage difference between the cathode 276 and the anode 262, that is generated from the external power supply, creates an arc in the gap between the cathode 276 and the anode 262, thus ionizing the gas and creating the plasma generator 290 which generates the plasma stream. Pressure from the external gas source and energy from the plasma generator 290 cause the plasma stream to move forward, exiting the plasma gas chamber 280 and entering the proximal end of the plasma nozzle 340. The plasma stream continues to flow through the plasma nozzle 340, exiting the apparatus 10 at the distal end of the nozzle 340.

Step 603 is to heat the powder material with a heating element to form a molten powder material. Powder material from the external powder feeding mechanism enters the apparatus through the powder material couplings 52, 54. The powder material travels in powder material tubes 52A, 54A through the rear housing assembly 200, the plasma gas distribution housing assembly 210, and the anode power and liquid distribution assembly 220 sections of the apparatus 10. The powder material then travels through the intermediate powder passageways 52B, 54B within the anode assembly 260, where the path of the powder material moves toward the center of the apparatus 10 in order to line up with the entry point of the heating element 350. The powder enters the powder melting chambers 52E, 54E within the heating chambers 352, 354 through the powder material inlets 52C, 54C.

A portion of the plasma generated by the plasma generator 290 enters the auxiliary plasma passageways 374, 376 through the auxiliary plasma inlet openings 370, 372, that are located within the anode assembly 260 just downstream from the plasma generator 290. At the end of the auxiliary plasma passageways 374, 376 are the plasma inlets 380, 382, which control the flow of plasma into the heating chambers 352, 354. Inside the heating chambers 352, 354, plasma surrounds the powder melting chambers 52E, 54E to raise the temperature within the mixing tubes 52D, 54D to above the melting point of the polymer, which is approximately 170° C. As the plasma circles the powder melting chambers 52E, 54E, it generally moves from the back of the heating chambers 352, 354 to the front. Plasma is then exhausted from the heating chambers 352, 354 through the plasma outlets 390, 392 and the plasma outlet openings 394, 396 where it rejoins the plasma stream within the plasma nozzle 340.

Step 604 is to form covalent bonding of at least a portion of the molten powder material to create a coating material. It is possible that covalent bonding of at least a portion of the molten powder material will occur in the powder melting chambers 52E, 54E as the molten powder material passes through the mixing tubes 52D, 54D without the electrophoresis element. However, the electrophoresis element 55 is implemented in the apparatus 10 as described above to greatly increase and maximize the portion of the molten powder material that is covalently bonded.

The electrophoresis element 55 may include a series of driving electrodes 55J in pairs 501&502, 503&504, 505&506, 507&508 that are energized to create an electric field across the mixing tubes 55D. The electric field is created by energizing one of the pairs of electrodes, e.g. 501, to a positive voltage (up to 12 kV) while holding the other of the pairs of electrodes, e.g. 502, at ground (0V). In the presence of the electric field, the charged particles of the powder material may be slowed down, reoriented, or otherwise deflected from the paths they had when they entered the mixing tube 55D in order to encourage collisions between the polymer component and the marine biocide and the fungicide that lead to covalent bonding of the three components.

When the driving electrodes 55J are energized in a timing sequence, the components of the powder material generally align in order for the marine biocide and the fungicide to covalently bond with the polymer component. Typically, the timing sequence is repeated indefinitely. An example of the timing sequence may be as follows:

1. Energize driving electrode 501 to 12 kV for a period of 5 milliseconds (ms) while holding all other driving electrodes 502-508 at ground.
2. Energize driving electrode 503 to 12 kV for a period of 5 ms while holding all other driving electrodes 501, 502, 504-508 at ground.
3. Energize driving electrode 505 to 12 kV for a period of 5 ms while holding all other driving electrodes 501-504, 506-508 at ground.
4. Energize driving electrode 507 to 12 kV for a period of 5 ms while holding all other driving electrodes 501-506, 508 at ground.

The timing sequence above may be varied in many aspects. More than one driving electrode 55J may be energized at a time. It is possible that all the electrodes 501, 503, 505, 507 or 502, 504, 506, 508 on one side of the secondary tube 55H may be energized simultaneously or alternating electrodes may be driven simultaneously, e.g. 501, 504, 505, 508. The magnitude of the energizing voltage for any one or more of the driving electrodes 55J may be varied up to 12 kV. The period of time for which a driving electrode 55J is energized may vary. Furthermore, the order in which the driving electrodes 55J are energized may also vary.

The timing sequence for the electrophoresis element 55 may be programmed with the electrophoresis sequence controller and may be adjusted either manually or automatically to change the timing sequence in order to optimize covalent bonding for varying operating conditions or changes in the powder material composition.

The result of step 504 generally should be to transform the heated, amorphous powder material into a coating material comprised primarily of three-part structures. Each three-part structure includes one polymer element covalently bonded to both one marine biocide element and one fungicide element, wherein the marine biocide element and the fungicide element do not bond to each other.

Step 605 is to inject the coating material into the plasma stream. After the powder material has been heated and covalent bonding of the marine biocide and the fungicide to the polymer component has occurred to create the coating material, the coating material may exit the mixing tubes 52D, 54D through the powder material outlets 52F, 54F. The coating material then passes through the powder material openings 52G, 54G to join the plasma stream near the distal end of the plasma nozzle 340. The powder material outlets 52F, 54F are angled with respect to the longitudinal axis of the plasma nozzle 340 to supply their contents to the plasma stream with as much forward velocity as possible. The combined plasma stream and coating material exits the plasma nozzle 340 and travels toward the target surface.

Step 606 is to utilize the liquid to cool portions of the plasma generator and the heating element. Pressure from the external liquid source generally forces the liquid to flow through the liquid cooling system and back to the source as described below. Liquid from the external source enters the apparatus through the liquid input coupling 60 and the liquid input tube 62. From there, the liquid flows into the first cathode liquid distribution passageways 278 and fills the intermediate liquid input chamber 215. The liquid exits the intermediate liquid input chamber 215 through the second cathode liquid distribution passageways 218 and flows into the first liquid cooling chamber 310. Liquid in the first liquid cooling chamber 310 cools the proximal portion of the anode 262, which is also in the vicinity of the cathode mount 274. Hence, liquid in the first liquid cooling chamber 310 cools a portion of the plasma generator 290.

The liquid exits the first liquid cooling chamber 310 through the anode liquid input passageways 264 and into the second liquid cooling chamber 320. Liquid in the second liquid cooling chamber 320 surrounds and cools the heating element 350. The liquid exits the second liquid cooling chamber 320 through the anode liquid output passageways 266 and flows into the third liquid cooling chamber 360. Liquid in the third liquid cooling chamber 360 mainly cools the outer portion of the anode 262. The liquid exits the third liquid cooling chamber 360 through the liquid output tube 71 and then exits the apparatus 10 through the liquid output coupling 70.

Step 607 is to inject the gas for shielding to form a gas flow in the direction of the plasma stream that rotates about the center of the plasma stream. Gas from the external source enters the apparatus 10 through the shield gas coupling 90 and flows through the shield gas tube 92 and the shield gas passageway 242. The gas then enters the shield gas chamber 244, which encircles the shield gas injector 400. Pressure from the external gas source forces the gas in the shield gas chamber 244 through the shield gas injector passageways 410. Since the shield gas injector passageways 410 are angled both forward and laterally with respect to the longitudinal axis of the plasma nozzle 340, the gas that passes through the shield gas injector 400 creates a gas flow that rotates around the plasma and coating stream as the gas moves forward. Thus, the shield gas flow wraps around the plasma and coating stream and protects the stream from contaminants and oxidization while it is in flight until the coating material can cover the target surface.

The shield gas, being lower in temperature than the plasma stream, also serves another purpose. It can help to cool the coating material structures in flight. It is desired for the three-part structures of the coating material to have enough thermal energy for the polymer element to stick to the target surface. However, there should not be so much thermal energy so that the covalent bonds of the three-part structure may be broken. Cooling the coating material maintains the integrity of the three-part structures.

Step 608 is to force compressed air to form a circumferential laminar air flow around the plasma stream to cool a target surface. The compressed air may be delivered from an external air compressor through a hose connected to the forced air inlet 40. Compressed air flows through the forced air inlet opening 252 and fills the circumferential air chamber 254. Air is forced out of the circumferential air chamber 254 and exits the cooling nozzle 420 in the forward direction from the apparatus 10. The forced air flow is somewhat cylindrical in nature and surrounds both the plasma and coating material stream and the shielding gas flow. The coating material is applied to the target surface in a generally circular pattern. The compressed air flow cools the area of the target surface around the central circular region of application. Thus, as the apparatus scans the surface to apply the coating material, the compressed air flow will cool those areas of the surface where the coating has already been applied.

Compressed air is generally used while applying a coating to materials that require cooling during application such as fiberglass, carbon fiber composites, and wood.

Step 608*a* is to provide vacuum to remove stray particles and fumes the application process. The vacuum may be provided from an external vacuum system or compressor and vacuum system that is connected through a hose to the forced air inlet 40, which in this embodiment is functioning as an outlet to the vacuum source. The same structure of the apparatus 10 is utilized for the vacuum function as is used for the forced air system of step 608, wherein the cooling nozzle 420 is a vacuum nozzle. Particles and fumes swept up by the nozzle 420 may spin around the circumferential air chamber 254 before exiting the apparatus through the forced air inlet opening 252 and into the hose that returns to the external vacuum system.

The vacuum is utilized to remove fumes and stray particles that may reflect or bounce back from the substrate during the application of the coating material in situations where cooling of the substrate material is not necessary, such as with the steel hull of a ship.

Step 609 is to mix ambient air with the plasma stream. The apparatus 10 may include the air-plasma mixture inlet 430 in the gap between the forced air shroud 250 and the liquid shroud 240. The air-plasma mixture inlet 430 allows ambient air around the body 30 of the apparatus 10 to mix with the plasma stream as the stream exits the plasma nozzle 340 but before the plasma stream clears the distal end of the apparatus 10. Mixing air with the plasma stream prevents a flame condition in the plasma stream from occurring which may comprise the integrity of the coating material, disrupt the plasma and coating material stream, or create a hazardous situation for the apparatus operator or others in the vicinity of the apparatus 10.

In other embodiments of the invention, it is possible the apparatus is used to apply a primer coating to the target surface before applying the antifoulant coating as illustrated in the steps of FIG. 11. In situations where the cleanliness of the target surface may be in question or the outer layer of the target surface may not easily bond with the antifoulant coating, a primer layer of just the polymer element may applied before applying the antifoulant coating. The method of application for the primer would be the same as the method for applying the antifoulant, except the powder source material would include only the polymer component. The electrophoresis element 55 would function the same, however no covalent bonding of the powder material would occur because the marine biocide and the fungicide components would be lacking.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An apparatus for spraying a coating material onto a target surface, comprising:

a plasma generator operable to supply a plasma stream;

a plasma nozzle, including a proximal end operable to receive the plasma stream and a distal end operable to guide the coating material onto a target surface;

a heating element adjacent to the plasma nozzle operable to receive a portion of the plasma stream from the plasma generator and further operable to apply heat to a powder material received from a source external to the apparatus in order to form a molten powder material; and an electrophoresis element coupled to the heating element and including at least one pair of electrodes spaced apart and aligned with one another such that the molten powder material passes through the space between the pair of electrodes, the electrophoresis element operable to enhance covalent bonding of a portion of the molten powder material to form a coating material.

2. The apparatus of claim 1, wherein the electrophoresis element comprises a plurality of pairs of electrodes, wherein each pair is operable to establish an electric field which can manipulate ionized particles in the molten powder material in order to maximize covalent bonding.

3. The apparatus of claim 1, wherein the plasma generator comprises:

a first gas coupling, operable to receive gas from an external source;

a first gas passageway in communication with the first gas coupling, operable to transport gas from the gas coupling;

a gas distribution element in communication with the first gas passageway, operable to guide the flow of the gas;

a gas chamber in communication with the gas distribution element, operable to store the gas;

a cathode, operable to supply a negative charge;

an anode, operable to supply a positive charge, and operating in combination with the cathode to ionize the gas; and an outlet, operable to couple with the proximal end of the plasma nozzle.

4. The apparatus of claim 1, further comprising a plurality of powder material couplings in communication with a plurality of powder material passageways, the powder material couplings operable to receive the powder material.

5. The apparatus of claim 4, wherein the heating element further comprises:

a heating chamber, including:

a plasma inlet in communication with the plasma generator, the plasma inlet operable to control the temperature of the heating element, and a plasma outlet in communication with the plasma nozzle, operable to exhaust plasma into the plasma stream; and a powder melting chamber, located within the heating chamber, including:

a powder material inlet in communication with one of the powder material passageways, operable to supply unheated powder material, and a powder material outlet in communication with the plasma nozzle downstream from the plasma outlet, operable to transfer the coating material to the plasma stream.

6. The apparatus of claim 1, further comprising a liquid cooling system, including:

a liquid input coupling, operable to receive liquid to an external source;

a liquid output coupling, operable to return liquid to an external source;

a first liquid cooling chamber, operable to cool a portion of the plasma generator;

a second liquid cooling chamber, operable to cool a portion of the heating element; and a plurality of liquid passageways, operable to provide fluid communication between the liquid input coupling, the liquid output coupling, and the first and second liquid cooling chambers.

7. The apparatus of claim 1, further comprising a shield gas system, including:

a shield gas coupling, operable to receive gas from an external source;

a shield gas passageway in communication with the shield gas coupling, operable to transport gas from the shield gas coupling; and a shield gas injector in communication with the shield gas passageway, located near the distal end of the plasma nozzle and operable to create a shield gas stream rotating about the longitudinal axis of the plasma nozzle.

8. The apparatus of claim 1, further comprising a forced air system, operable to cool the target surface, including:

a forced air inlet, operable to receive pressurized air flow from an external source;

a circumferential air chamber in communication with the forced air inlet, surrounding the distal end of the plasma nozzle; and a cooling nozzle:

in communication with the circumferential air chamber, coaxial to the plasma nozzle, of a larger diameter than the plasma nozzle, located downstream from the distal end of the plasma nozzle, and operable to direct a cooling airflow parallel to the longitudinal axis of the plasma nozzle and in the same direction as the plasma stream.

9. The apparatus of claim 1, further comprising a vacuum system, operable to remove fumes and stray particles during the application process, including:

a vacuum nozzle:

coaxial to the plasma nozzle, of a larger diameter than the plasma nozzle, located downstream from the distal end of the plasma nozzle, and operable to remove fumes and stray particles that may reflect from the target surface;

a circumferential air chamber in communication with the vacuum nozzle, surrounding the distal end of the plasma nozzle; and a vacuum outlet, operable to receive an air vacuum from an external source.

10. The apparatus of claim 1, further comprising an air inlet, located along a portion of the circumference surrounding the plasma nozzle, operable to supply external air flow to the plasma stream in order to regulate the air-plasma mixture of the plasma stream.

11. The apparatus of claim 2, wherein each pair of electrodes is spaced apart and aligned with one another and the plurality of pairs of electrodes are positioned adjacent one another such that the molten powder material passes through the space between the pairs of electrodes.

12. The apparatus of claim 5, wherein the pair of electrodes are positioned opposing one another along a cylindrical wall of the powder melting chamber.

13. An apparatus for spraying a marine antifoulant coating onto a target surface, comprising:

a powder material coupling, operable to receive pressurized powder material from an external source;

a heating element in communication with the powder material coupling, operable to apply heat to the pressurized powder material in order to form a molten powder material;

an electrophoresis element coupled to the heating element and including a plurality of pairs of electrodes with each pair spaced apart and aligned with one another and the plurality of pairs of electrodes positioned adjacent one another such that the molten powder material passes through the space between the pair of electrodes the electrophoresis element operable to enhance covalent bonding of a portion of the molten powder material to form a coating material;

a plasma generator, operable to supply a plasma stream, including:

a gas chamber, operable to receive gas from an external source, a cathode, operable to supply a negative charge, and
an anode, operable to supply a positive charge, and operating in combination with the cathode to ionize the gas;

a plasma nozzle, including:

a proximal end in communication with the plasma generator, operable to receive the plasma stream, a middle section, operable to receive the coating material from the heating element, and a distal end, operable to guide the coating material onto a target surface; and a shield gas system, including:

a second gas coupling, operable to receive gas from an external source, a second gas passageway in communication with the second gas coupling, operable to transport gas from the second gas coupling, and a gas injector in communication with the gas passageway, located near the distal end of the plasma nozzle and operable to create a gas stream rotating about the longitudinal axis of the plasma nozzle.

14. The apparatus of claim 13, further comprising a liquid cooling system, including:

a liquid input coupling and a liquid output coupling, operating in combination to recirculate cooling liquid;

a first liquid cooling chamber, operable to cool a portion of the plasma generator;

a second liquid cooling chamber, operable to cool a portion of the heating element; and a plurality of liquid passageways, operable to provide fluid communication between the liquid input coupling, the liquid output coupling, and the first liquid cooling chamber and second liquid cooling chamber.

15. The apparatus of claim 13, further comprising a forced air system, operable to cool the target surface as coating material is applied, including:

a first air inlet, operable to supply pressurized air flow from an external source;

a circumferential air chamber in communication with the first air inlet, surrounding the distal end of the plasma nozzle; and a cooling nozzle:

in communication with the circumferential air chamber,
coaxial to the plasma nozzle,
of a larger diameter than the plasma nozzle,
located downstream from the distal end of the plasma nozzle, and
operable to direct a cooling airflow parallel to the longitudinal axis of the plasma nozzle and in the same direction as the plasma stream.

16. The apparatus of claim 13, further comprising a vacuum system, operable to remove fumes and stray particles during the application process, including:

a vacuum nozzle:

coaxial to the plasma nozzle,
of a larger diameter than the plasma nozzle,
located downstream from the distal end of the plasma nozzle, and
operable to remove fumes and stray particles that reflect from the target surface;

a circumferential air chamber in communication with the vacuum nozzle, surrounding the distal end of the plasma nozzle; and a vacuum outlet, operable to receive an air vacuum from an external source.

17. The apparatus of claim 13, further comprising a second air inlet, located along a portion of the circumference surrounding the plasma nozzle, operable to supply external air flow to the plasma stream.

18. The apparatus of claim 13, wherein the heating element further comprises:

a heating chamber, including:

a plasma inlet in communication with the plasma generator, the plasma inlet operable to control the temperature of the heating element, and a plasma outlet in communication with the plasma nozzle, operable to exhaust plasma into the plasma stream; and a powder melting chamber, located within the heating chamber, including:

a powder material inlet in communication with one of the powder material passageways, operable to supply unheated powder material, and a powder material outlet in communication with the plasma nozzle downstream from the plasma outlet, operable to transfer the coating material to the plasma stream.

19. The apparatus of claim 18, wherein the pairs of electrodes are positioned opposing one another along a cylindrical wall of the powder melting chamber.

* * * * *